PROCESS OF MAKING WAFER COILS
Filed Oct. 31, 1955
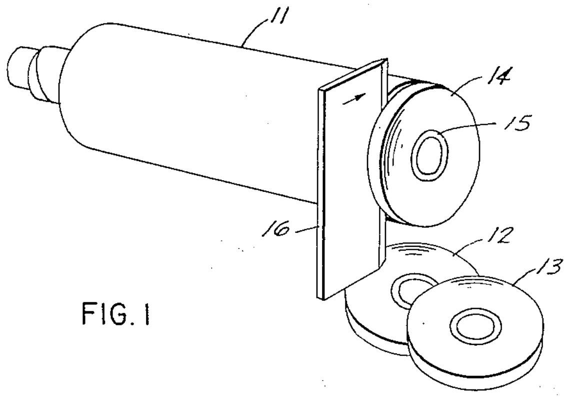
FIG. 1
FIG. 2
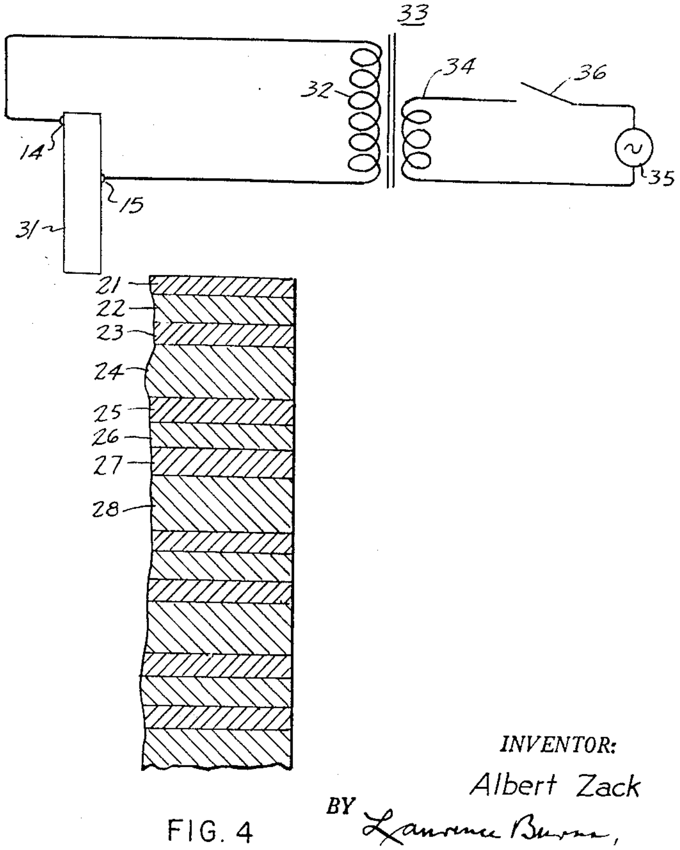
FIG. 2, FIG. 4
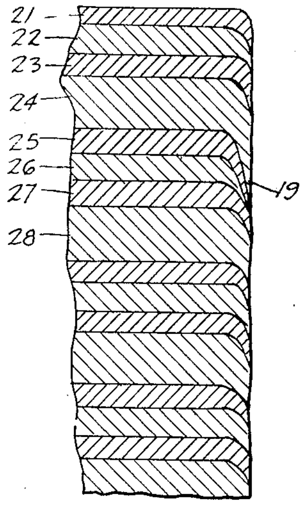
FIG. 3
INVENTOR:
Albert Zack
BY Laurence Burns,
ATTORNEY United States Patent Office 2,961,521
Patented Nov. 22, 1960

2,961,521

PROCESS OF MAKING WAFER COILS

Albert Zack, Danvers, Mass., assignor, by mesne assignments, to Sylvania Electric Products Inc., Wilmington, Del., a corporation of Delaware Filed Oct. 31, 1955, Ser. No. 543,726

3 Claims. (Cl. 219—19)

My invention relates to a method for removing imperfections from coils and is especially adapted for use in the manufacture of the wafer type of electrical coils.

More particularly, my invention relates to a method for removing from wafer-type electrical coils the burrs which are sometimes formed during the operation in which wound rolls are sliced into a plurality of wafer coils.

In order to achieve a certain degree of automation in the production of coils and transformers for electrical and electronic circuits, a process of coil manufacture has been developed wherein sheets of conductive material are rolled together with sheets of insulating material to form a substantialy cylindrical roll from which a large number of so-called wafer coils may then be formed by simply slicing the roll in a plurality of planes normal to the axis of the roll. Assuming that the roll was fabricated from very thin conductive material and very thin insulating material, in order to get a large number of turns into a small volume, the distance between adjacent turns of the roll is necessarily very small. Accordingly, when the wound roll is later separated into a number of wafer coils, there is a chance that the tool employed to perform the separation may swage over portions of the edge of the conductive material so that they form burrs which cross the edge of the adjacent insulating material and come in contact with another layer of the conductive material. When such swaging takes place during the slicing or cutting operation, the result may be one or more wafer coils having electrical short circuits between adjacent turns of conductive material. Since such inter-turn short circuits impair the quality of the wafer coil and might even lead to failure of the coil, it is important that any burrs which might otherwise cause short circuits be removed.

Accordingly, it is an object of my invention to provide a method for removing burrs produced upon wafer coils during the process of dividing the wound rolls into wafer coils.

It is a specific object of my invention to provide a method for removing from the surface of wafer coils any material which might cause short circuits between any two turns of the wafer coils.

I have been able to fulfill these and other objects of my invention by connecting between the secondary terminals of a transformer the wafer coil characterized by the undesired surface imperfections and by applying to said wafer coil through the transformer a pulse of electrical energy which is sufficient to cause the surface imperfections upon the coil to be burned away. That is to say, by applying a concentrated pulse of electrical energy between the terminals of a wafer coil, any short circuits which may exist between turns of the wafer coil will be removed because of the fact that the short-circuit paths are incapable of carrying the high currents which the pulse of energy tends to induce. The duration of the pulse of electrical energy applied to the coil in accordance with the method of my invention should be just sufficient to permit burning away the surface imperfections without damaging the main body of the coil. A fuller understanding of the method according to my invention will be derived from a study of the following specification taken in conjunction with the attached drawings in which:

Fig. 1 is a schematic perspective view of a way in which a wound roll may be separated into a number of wafer coils;

Fig. 2 is a circuit diagram of electrical apparatus which may be employed in the practice of the method according to my invention;

Fig. 3 is a fragmentary sectional view taken near the surface of a wafer coil characterized by the surface imperfections which are to be eliminated by the method according to my invention; and Fig. 4 is a fragmentary sectional view of the same portion of a wafer coil near the surface thereof after said surface has undergone a removal of imperfections by the method according to my invention.

Turning to Fig. 1, the wound roll 11 which is shown being separated into wafer coils such as those at 12 and 13 may be fabricated in any one of a number of different ways, one way being simply to wind upon an arbor or mandrel a sheet of conductive material which has been coated on at least one side with insulating material such as lacquer or a polyvinyl plastic. If desired, the wound roll may be built up by winding together a sheet of conductive material such as metal foil with a sheet of insulating material such as paper or resilient plastic material, the result being a substantially cylindrical roll in which each layer of conducting material is separated from the next layer of conducting material by a layer of insulating material. Although these two methods of building up a wound roll have many advantages, for some purposes I favor a wound roll which has been built up by interposing between each pair of layers of conductive material three layers of insulating material. For the insulating materials, I prefer to employ a sheet of resilient epoxy resin available on the market under the trademark "Mylar," said layer of resilient resin being sandwiched between a pair of layers of kraft paper or its equivalent. In the specification which follows, it will be assumed that the wafer coils referred to have been cut from a wound roll which was fabricated in accordance with this last-named method.

During the process of fabricating the wound roll, it may be found advantageous to fasten an elongated piece of conductive material such as a copper tube to the sheet of conducting foil near its innermost end and parallel to the axis about which the wound roll is to be built up. Similarly, when the process of fabricating the wound roll is nearly complete, it may be found advantageous to fasten another elongated piece of conductive material to the conductive foil near its outer end, thereby providing the wound roll with a pair of terminals each of which makes good contact with the conductive portion of the wound roll throughout the entire length of the roll as measured in an axial direction. Thus, when the wound roll is later separated into a number of wafer coils by cutting it in planes normal to its axis, each wafer coil will then be equipped with a pair of terminals which make contact with the conductive portion of the coil near the respective ends thereof. An oblique end view of such terminals is shown in Fig. 1 at 14 and 15 respectively.

While the wound roll may be separated into wafer coils by a number of different methods, I prefer to rotate the wound roll about its longitudinal axis by holding it at one end in a chuck or similar device while a knife blade as shown at 16 is forced to advance into the wound roll from the outside toward the center, said knife blade moving successively in planes normal to the axis of the wound roll. Such a method of separating wafer coils has the advantage of wasting a minimum amount of material, unlike a sawing process, which would waste a considerable amount of material. On the other hand, as the knife blade is forced through the wound roll, despite the rotation of the roll, the knife blade swages the edges of the conductive material and the insulating material of which the wafer coil is composed. Such swaging of the coil materials is illustrated at the right hand side of Fig. 3, wherein layers 21, 22 and 23 represent the outermost turns of the insulating material, while layer 24 represents the outermost turn of the conductive material. Similarly, in Fig. 3, layers 25, 26 and 27 represent respectively the next-to-outermost layers of insulating material, whereas layer 28 represents the next-to-outermost layer of conductive material, and so on. It will be seen that, during passage of knife 16 through the wound roll, the edge of conductive layer 24 has been swaged over into the form of a flange 19 the edge of which nearly reaches conductive layer 28. Obviously, if the flange 19 of conductive layer 24 were to be forced through insulating layer 27 and make actual contact with conductive layer 28, there would be a short circuit between the two outer turns of the wafer coil. On the other hand, if the flange of conductive layer 24 does not quite make contact with conductive layer 28 but, as shown, is spaced therefrom by only a single layer of insulating material, the breakdown strength of the coil will be considerably lowered, and the dielectric strength between the two outer conductive turns will be that of a single layer of insulating material rather than of the three layers which are wound between every two adjacent turns of conductive material. Clearly, in the first case, the wafer coil will be practically worthless, while in the second case its value will be considerably impaired unless the surface imperfections resulting from the swaging are removed.

I have found that the surface imperfections of a wafer coil having an appearance in section as shown in Fig. 3 may be substantially completely removed, in which case the appearance in section of the same portion of the wafer coil will be as shown in Fig. 4, in which, for purposes of comparison, the same reference numerals have been used as in Fig. 3. It will be noted that, on the right-hand side of Fig. 4, the flanges produced by the swaging process are no longer present, and advantage may be taken of all three layers of insulating material which are wound between every two adjacent layers of conductive material.

In order to carry out the process which transforms a coil as shown in Fig. 3 into a coil as shown in Fig. 4, I connect a wafer coil such as that shown at 31 in Fig. 2, by its respective terminals 14 and 15, across the secondary winding 32 of a transformer 33 having a primary winding 34, a source of alternating electromotive force 35 and a switch 36 in its supply circuit. It will be understood that the terminals shown at 14 and 15 respectively in Fig. 2 resulted from the slicing of the wound roll in which the respective elongated conducting members 14 and 15, of which an oblique end view is shown in Fig. 1, were sliced into lengths equal to the thickness of the wafer coil. Employing copper tubing for such terminals facilitates making electrical connections thereto because the electrical leads may then simply be inserted into the pieces of tubing and soldered in place.

In carrying out the method according to my invention, I close switch 36 which connects source 35 to transformer 33, which may be of the step-up variety in order to produce at its secondary winding a voltage sufficient to accomplish the desired purpose. A voltage of the order of 1200 should suffice in the case of a typical coil of 1½ inch diameter. Such a voltage applied across the coil is sufficient to give voltages between turns which are capable of burning away the thin flanges of conductive material that exist on the faces of the wafer coil. The heat liberated during the burning away of the conductive flanges may be sufficient also to burn away the swaged-over portions of the insulating material, thereby reducing the surface of the wafer coil to the smooth condition shown in Fig. 4. As soon as this condition is attained, which may require less than a second even with currents of less than an ampere, the switch 36 should be opened, thereby preventing damage to the main body of the coil. If desired, the electrical energy supplied to transformer 33 may be pulsed, but there seems to be no great advantage in so doing because satisfactory results may be obtained simply by closing switch 36 and opening it a short time later. I prefer to employ for transformer 33 a leakage transformer, which is a transformer having an iron core with a gap therein. Such a gap prevents close coupling between the primary and secondary windings of the transformer, thereby limiting to some extent the magnitude of the current which can flow in the secondary winding and protecting the wafer coil from substantial damage thereto. It will be understood that use of a transformer to supply the electrical surge to the wafer coil is illustrative only, and that any other equivalent surge-generating means may be employed for this purpose.

While I have described and illustrated a favored way in which the method according to my invention may be practiced, it will be understood that numerous changes may be made in the method without departing from the scope of my invention. Accordingly, I desire that the scope of my invention should be limited only by the appended claims.

What I claim as new and desire to secure by Letters Patent of the United States is:

1. A method for treating electrical coils comprised of turns of metal foil interleaved with turns of insulating material to remove short-circuiting swaged edges, comprising connecting the coil across a supply of current and passing through the coil a surge of alternating current of wattage sufficiently high to cause the swaged edges to burn through.

2. A method for treating electrical coils comprised of turns of metal foil interleaved with turns of insulating material to remove short-circuiting swaged edges, comprising connecting the coil across a supply of current of relatively high voltage, and passing current through the coil until the high resistance at the shorted portions of the foil edges develops sufficient heat to melt the metal foil.

3. A method for treating electrical coils comprised of turns of metal foil interleaved with turns of insulating material to remove short-circuiting swaged edges, comprising connecting the coil across the output winding of a leakage transformer, and passing through the coil current from the transformer of sufficient power to melt the contacting portions of the edges of the turns of metal foil.

References Cited in the file of this patent

UNITED STATES PATENTS

| | | |
|---|---|---|
| 1,337,245 | Macpherson | Apr. 20, 1920 |
| 2,070,435 | Katzman | Feb. 9, 1937 |
| 2,108,637 | Bartgis | Feb. 15, 1938 |
| 2,494,029 | Bertalan et al. | Jan. 10, 1950 |